United States Patent
Balk

(10) Patent No.: US 8,240,600 B2
(45) Date of Patent: Aug. 14, 2012

(54) PYLON FOR SUSPENDING AN ENGINE BENEATH AN AIRCRAFT WING

(75) Inventor: Wouter Balk, Melun (FR)

(73) Assignee: Snecma, Paris (FR)

( * ) Notice: Subject to any disclaimer, the term of this patent is extended or adjusted under 35 U.S.C. 154(b) by 658 days.

(21) Appl. No.: 12/199,218

(22) Filed: Aug. 27, 2008

(65) Prior Publication Data

US 2009/0084893 A1 Apr. 2, 2009

(30) Foreign Application Priority Data

Aug. 30, 2007 (FR) ..................... 07 06076

(51) Int. Cl.
*B64D 27/00* (2006.01)
(52) U.S. Cl. .............. 244/54; 244/56; 60/796; 248/554; 248/556; 248/557
(58) Field of Classification Search .................. 244/54, 244/56, 12.3, 12.4, 23 B; 60/796; 248/554–557
See application file for complete search history.

(56) References Cited

U.S. PATENT DOCUMENTS

| 2,815,184 | A | | 12/1957 | Westphal et al. | |
|---|---|---|---|---|---|
| 3,201,071 | A | * | 8/1965 | De Siebenthal | 244/56 |
| 4,150,802 | A | * | 4/1979 | Evelyn et al. | 244/54 |
| 4,555,078 | A | * | 11/1985 | Grognard | 244/54 |
| 7,063,290 | B2 | * | 6/2006 | Marche | 244/54 |
| 2008/0251633 | A1 | * | 10/2008 | Journade et al. | 244/54 |
| 2010/0181418 | A1 | * | 7/2010 | Vauchel et al. | 244/54 |
| 2011/0192933 | A1 | * | 8/2011 | Guering et al. | 244/54 |

FOREIGN PATENT DOCUMENTS

FR 1.006.380 4/1952
GB 2 064 005 A 6/1981

* cited by examiner

*Primary Examiner* — Rob Swiatek
*Assistant Examiner* — Philip J Bonzell
(74) *Attorney, Agent, or Firm* — Oblon, Spivak, McClelland, Maier & Neustadt, L.L.P.

(57) ABSTRACT

A pylon for suspending an engine beneath an aircraft wing, capable of being attached by one end to a casing of the engine and by another end to the wing is disclosed. The pylon includes at least one articulation actuated by a actuator making it possible to change the height position of the engine on the ground and in flight.

13 Claims, 1 Drawing Sheet

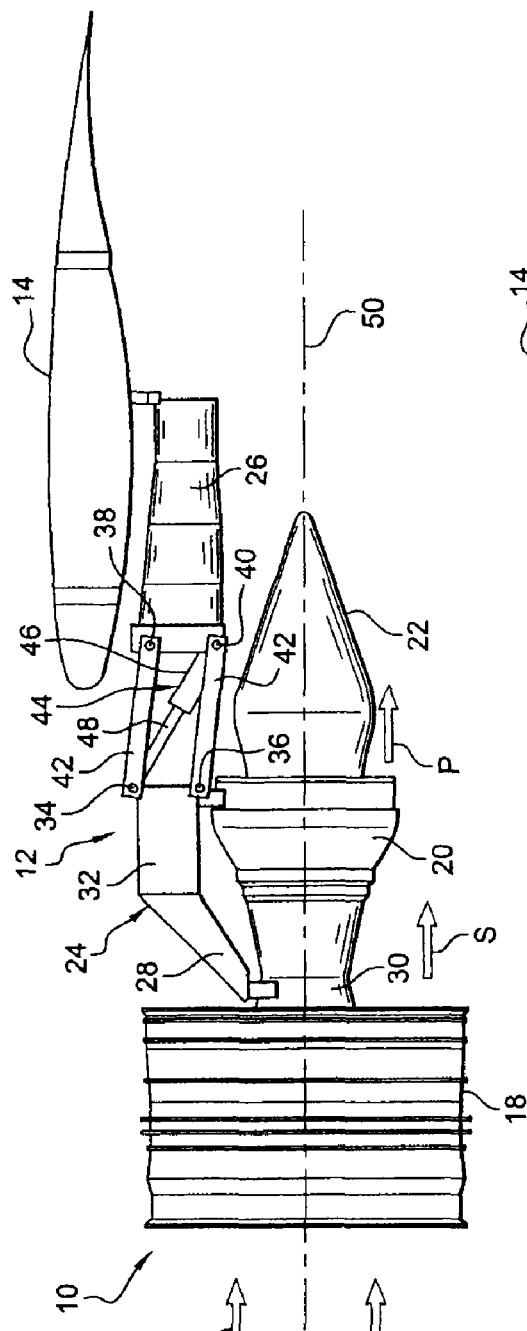
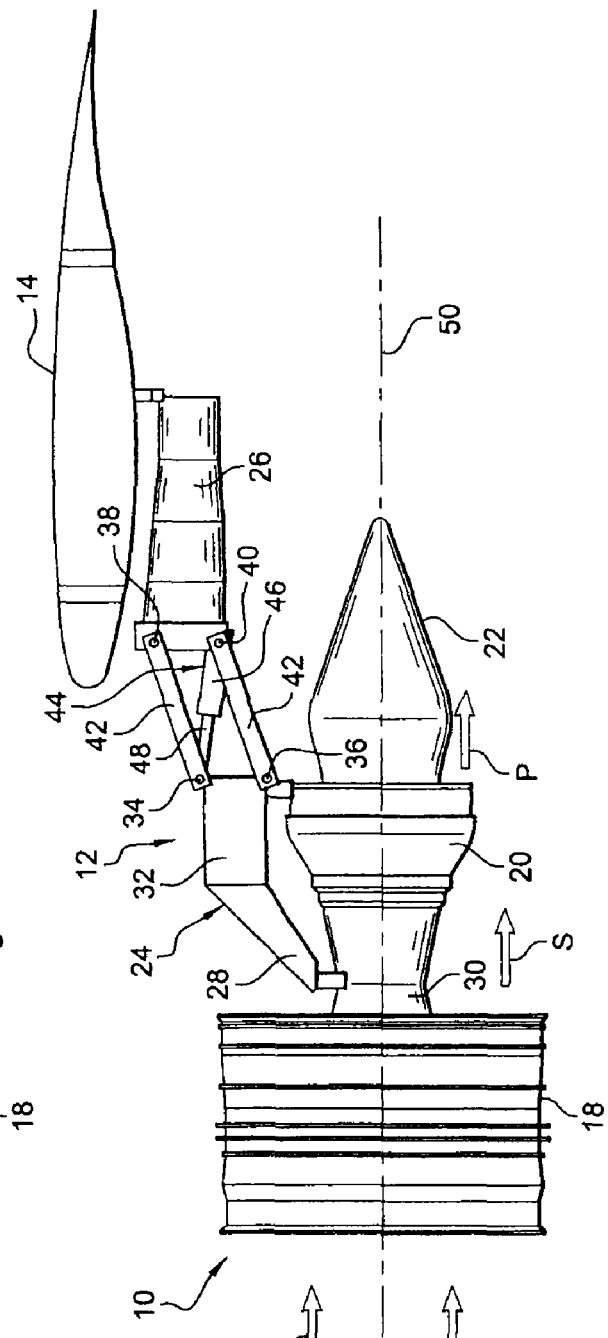
Fig. 1
Fig. 2

PYLON FOR SUSPENDING AN ENGINE BENEATH AN AIRCRAFT WING

The present invention relates to a pylon for suspending an engine under an aircraft wing, and an engine attached under a wing with a pylon of this type.

BACKGROUND OF THE INVENTION

In turbofan engines, the air entering the turbomachine is divided into a primary flow or hot flow passing through a compressor which supplies a combustion chamber arranged downstream and into a secondary flow or cold flow, providing a considerable portion of the thrust, which flows around the compressor and which is discharged with the hot gases.

In order to restrict the consumption of fuel and the noise level, the engine manufacturers seek to increase the rate of dilution which is equal to the ratio between the output flow of cold air and the output flow of hot air, which leads to an increase in the diameter of the turbomachine. Because these engines are installed under the wings, the increase in the rate of dilution is limited by the need to have a minimal distance between the nacelle, that is to say the outer envelope of the turbomachine, and the ground.

For safety reasons, the engine is usually positioned upstream of the wing in order that, in the event of a shattering of a rotor disk, for example, the debris is prevented from reaching the portions of the wing where the fuel is stored. For the same reason, the engines are not incorporated into the wing.

A first approach would consist in increasing the height of the landing gear in order to increase the distance between the turbomachine and the ground. However, this solution is not satisfactory because it leads to a substantial increase in the cost and weight of the aircraft. A second approach consists in bringing the turbomachine closer to the wing and therefore reducing the distance between the nacelle and the wing. The air circulating in this space is thus accelerated, which may cause the formation of shock waves inducing a considerable increase in aerodynamic drag.

It is however preferred, in the prior art, to maintain a sufficient ground clearance and bring the engine closer to the wing, despite the disadvantages that that comprises.

SUMMARY OF THE INVENTION

The subject of the present invention is a pylon for suspending an aircraft engine which avoids these disadvantages of the prior art in a simple, effective and economical manner.

Accordingly it proposes a pylon for suspending an engine beneath an aircraft wing, capable of being attached by one end to a casing of the engine and by another end to the wing, which comprises at least one articulation and a motorized means making it possible to change the height position of the engine between a "cruise" position and a takeoff/landing position.

The incorporation according to the invention of an articulation in the pylon allows a relative movement of the engine relative to the wing and relative to the ground. The invention therefore makes it possible to adapt the position of the engine relative to the wing according to the various phases of flight. When the aircraft is on the ground or in the takeoff or else landing phase, the engine is brought closer to the wing so that the distance between the nacelle and the ground is sufficient. In the cruise phase, the engine may be moved away from the wing, which makes it possible to limit the aerodynamic drag and therefore optimize fuel consumption.

In addition, such an articulated pylon makes it possible to make maintenance operations easier by allowing the engine to be lowered.

The motorized means for changing the height position of the engine may for example be an electric or hydraulic actuator.

This actuator makes it possible to control the movement of the engine relative to the wing. In the case of a hydraulic actuator, the latter may be connected to the hydraulic circuit of the landing gear for example, thereby allowing it to be supplied with power.

In addition, if a blade is lost, the hydraulic actuator may absorb a portion of the energy released by the separation of a blade from its attachment point.

Advantageously, the articulation comprises at least one deformable quadrilateral comprising two link rods whose ends are articulated about horizontal transverse axes on two portions of the pylon, of which one is attached to the engine casing and the other to the wing.

According to a feature of the invention, the two link rods are parallel and have identical lengths.

The two link rods may also have different lengths which makes it possible, by actuating the actuator, to incline the engine relative to the horizontal in the take off phase in order to optimize the intake of air into the turbomachine.

The invention also relates to an aircraft engine attached under a wing by a suspension pylon, wherein this pylon is of the type described above.

Typically, the variation in the height position of the engine beneath the wing is approximately 20 cm.

BRIEF DESCRIPTION OF THE DRAWINGS

The invention will be better understood and other details, advantages and features of the invention will appear on reading the following description made as a nonlimiting example with reference to the appended drawings in which:

FIG. 1 is a schematic view in axial section of a suspension pylon according to the invention, the engine being in the high position;

FIG. 2 is a schematic view in axial section of this pylon, the engine being in the low position.

DESCRIPTION OF THE PREFERRED EMBODIMENTS

Reference is first of all made to FIG. 1 which schematically represents a turbojet 10 coupled by a pylon 12 upstream of and under the wing 14 of an aircraft.

The turbojet comprises a nacelle (not shown) attached to a casing 18 of cylindrical shape which surrounds the front portion of the engine of which only the downstream portion is visible and a fan wheel (not visible) mounted inside the casing 18. This fan wheel is rotated by the turbine of the turbojet in a manner well known to those skilled in the art.

When the engine operates, the air entering upstream, represented by the arrows E, is divided into a primary flow and a secondary flow respectively. The primary flow supplies an intake compressor, then is mixed with fuel and burned in the combustion chamber. The combustion gases pass through a turbine in order subsequently to be discharged into an exhaust casing 20 around an exhaust cone 22 as shown by the arrow P. The secondary flow (arrow S), flows around the body of the engine and represents most of the thrust in a high dilution rate engine.

The suspension pylon 12 is formed in this example of two portions, upstream 24 and downstream 26, the downstream portion 26 being attached under the wing 14 of the aircraft and the upstream portion 24 being attached to the turbomachine 10. The upstream portion comprises an upstream arm 28 extending obliquely downward and attached at its upstream end to a high-pressure compressor casing 30. The arm 28 is connected at its downstream end to a portion 32 whose downstream end is attached to the exhaust casing 20. The upstream portion 24 and downstream portion 26 are connected at their downstream and upstream ends by link rods 42 whose ends are articulated on the upstream portion 24 and downstream portion 26 about horizontal transverse axes 34, 36 and 38, 40, respectively, so as to form an articulated quadrilateral. In the embodiment shown in the drawings, the link rods 42 have the same length and therefore form a deformable parallelogram.

A hydraulic or electric actuator 44 comprising a cylinder 46 and a piston rod 48 is mounted between the opposite articulation axes 34, 40 of the parallelogram, one end of the cylinder being articulated on the articulation axis 40 of the downstream portion 26 of the pylon 12 while one end of the piston rod 48 is articulated on the articulation axis 34 of the upstream portion 24 of the pylon 12, this installation making it possible to change the position of the engine relative to the wing, on the ground and in flight.

During the operation of the turbomachine 10, there are several flight phases during which the distance between the turbomachine 10 and the wing 14 must be changed. When stationary and during takeoff, the actuator makes it possible to keep the turbomachine 10 in a high position in order to maintain a maximal turbomachine/ground distance, the turbomachine 10 then being close to the wing 14. During a cruise phase, the actuator 44 makes it possible to move the turbomachine 10 away from the wing 14 in order to limit the effects of aerodynamic drag and therefore reduce fuel consumption. Finally, on landing, the turbomachine 10 is returned to the high position corresponding to take off in order to resume sufficient ground clearance. The actuator makes it possible for example to move the turbomachine 10 over a height of approximately 20 cm.

It should be noted that the increase in aerodynamic drag and therefore the increase in fuel consumption due to the closeness of the turbomachine 10 relative to the wing 14 during the takeoff and landing phases is largely compensated by the reduced consumption achieved during the cruise phase thanks to moving the turbomachine 10 away in order to limit drag and to the use of a high dilution rate turbomachine 10. In addition, the take off and landing phases are phases which do not last very long compared with the cruise phase.

As a variant, the ends of the actuator may be attached to the other two opposite articulation axes 36, 38 of the parallelogram, the actuator working in a reverse direction relative to the configuration represented in the drawings.

In another variant, it is possible to provide a quadrilateral articulated on either side of the actuator 44 in order to ensure a better hold of the turbomachine 10 and to better distribute the thrust of the turbomachine 10 over the whole of the pylon 12.

In yet another variant, the link rods 42 have different lengths, which makes it possible to change the inclination of the axis 50 of the turbomachine relative to the wing while moving the turbomachine further away or closer to the wing, in order in particular to improve the performance of the turbomachine 10 on take off.

In other variants of the invention, the articulation of the pylon may be provided between the pylon and the engine, or between the pylon and the wing.

The invention claimed is:

1. A system comprising:
an engine;
an aircraft wing; and
a pylon for suspending the engine beneath the aircraft wing, the pylon being attached by one end to a casing of the engine and by another end to the wing, which comprises at least one articulation connecting first and second portions of the pylon, the first portion being attached to the casing and the second portion being attached to the wing of the aircraft and a motorized means connecting the first portion of the pylon attached to the casing to the second portion of the pylon attached to the wing thus making it possible to change the height position of the engine between a cruise position and a take off/landing position.

2. The system as claimed in claim 1, wherein the variation of the height position of the engine beneath the wing is approximately 20 cm.

3. The system as claimed in claim 1, wherein the articulation comprises at least one deformable quadrilateral comprising two link rods whose ends are articulated about horizontal transverse axes on the first portion and on the second portion of the pylon, respectively.

4. The system as claimed in claim 3, wherein the motorized means comprises a hydraulic or electric actuator comprising a cylinder articulated on the second portion of the pylon and a piston rod articulated on the first portion of the pylon.

5. The system as claimed in claim 3, wherein the two link rods are parallel and have identical lengths.

6. The system as claimed in claim 1, wherein the first portion includes an upstream arm which extends obliquely downward with an upstream end attached to a high-pressure compressor casing.

7. The system as claimed in claim 6, wherein the first portion includes an intermediate portion with an upstream end connected to a downstream end of the upstream arm and a downstream end connected to an exhaust casing.

8. The system as claimed in claim 7, wherein the articulation includes at least one deformable quadrilateral including first and second link rods, first ends of the first and second link rods are articulated about first and second horizontal transverse axes on the first portion, respectively, and second ends of the first and second link rods are articulated about third and fourth horizontal transverse axes on the second portion, respectively.

9. The system as claimed in claim 8, further comprising an actuator with a piston rod articulated on the second horizontal transverse axis and a cylinder articulated on the third horizontal transverse axis.

10. A pylon for suspending an engine beneath an aircraft wing, the pylon comprising:
a first upstream portion;
a second downstream portion;
a first link rod which is connected at a first end to a lower side of a downstream end of the first upstream portion and which is connected at a second end to a lower side of an upstream end of the second downstream portion;
a second link rod which is connected at a first end to an upper side of the downstream end of the first upstream portion and which is connected at a second end to an upper side of the upstream end of the second downstream portion; and
an actuator which is connected at a first end to the upper side of the downstream end of the first upstream portion and which is connected at a second end to the lower side of the upstream end of the second downstream portion, wherein the first upstream portion includes an upstream arm extending obliquely downward and an axial portion, an upstream end of the upstream arm including a first attachment point which is attached to the engine, a downstream end of the upstream arm being connected to an upstream end of the axial portion, and a downstream end of the axial portion including a second attachment point which is attached to the engine, the second attachment point being higher than the first attachment point.

11. The pylon as claimed in claim 10, wherein the ends of the first and second link rods are articulated on the first upstream portion and the second downstream portion about horizontal transverses axes so as to present a deformable quadrilateral.

12. The pylon as claimed in claim 10, wherein the actuator comprises a piston rod and a cylinder.

13. The pylon as claimed in claim 12, wherein the piston rod is connected to the upper side of the downstream end of the first upstream portion and the cylinder is connected to the lower side of the upstream end of the second downstream portion.

* * * * *